(12) United States Patent
Wirth et al.

(10) Patent No.: US 9,221,335 B2
(45) Date of Patent: Dec. 29, 2015

(54) DRIVE DEVICE FOR A MOTOR VEHICLE AXLE WHICH, IN PARTICULAR, IS ELECTRICALLY-DRIVEN

(71) Applicant: Bayerische Motoren Werke Aktiengesellschaft, Munich (DE)

(72) Inventors: Christian Wirth, Ismaning (DE); Dariush Kiani, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/582,671

(22) Filed: Dec. 24, 2014

(65) Prior Publication Data

US 2015/0111681 A1 Apr. 23, 2015

Related U.S. Application Data

(63) Continuation of application No. PCT/EP2013/067528, filed on Aug. 23, 2013.

(30) Foreign Application Priority Data

Aug. 31, 2012 (DE) .......................... 10 2012 017 352

(51) Int. Cl.
*F16H 3/72* (2006.01)
*F16H 37/06* (2006.01)
(Continued)

(52) U.S. Cl.
CPC . *B60K 17/16* (2013.01); *B60K 1/00* (2013.01); *B60K 17/08* (2013.01); *F16H 3/46* (2013.01); *F16H 3/66* (2013.01); *F16H 48/06* (2013.01); *B60K 6/365* (2013.01); *B60K 6/445* (2013.01); *B60K 2001/001* (2013.01); *F16H 2200/0021* (2013.01); *F16H 2200/0034* (2013.01); *F16H 2200/201* (2013.01); *F16H 2200/2007* (2013.01); *F16H 2200/2035* (2013.01); *F16H 2200/2097* (2013.01)

(58) Field of Classification Search
CPC ................ F16H 2200/0021; B60K 2001/001; B60K 6/365; B60K 6/445
See application file for complete search history.

(56) References Cited

U.S. PATENT DOCUMENTS 2,531,996 A 7/1945 Voytech
4,418,777 A * 12/1983 Stockton ...................... 180/65.6
(Continued)

FOREIGN PATENT DOCUMENTS

DE 101 45 047 A1 4/2003
DE 10 2010 024 603 A1 12/2011
(Continued)

OTHER PUBLICATIONS

International Search Report dated Oct. 30, 2013 with English translation (seven (7) pages).
(Continued)

*Primary Examiner* — Tisha Lewis
(74) *Attorney, Agent, or Firm* — Crowell & Moring LLP

(57) ABSTRACT

A drive device for an electrically driven axle of a motor vehicle, has, as appropriate, a driving electric machine, a transmission gearing and a differential which, via drive output shafts, outputs drive power to driven wheels of the motor vehicle. The transmission gearing is formed by two planetary gear sets which are coupled to one another and which can be switched into two transmission ratio stages by way of switching elements.

19 Claims, 4 Drawing Sheets

(51) Int. Cl.
*B60K 1/00* (2006.01)
*B60K 6/365* (2007.10)
*B60K 6/445* (2007.10)
*B60K 17/16* (2006.01)
*F16H 3/66* (2006.01)
*B60K 17/08* (2006.01)
*F16H 3/46* (2006.01)
*F16H 48/06* (2006.01)

(56) References Cited

U.S. PATENT DOCUMENTS 4,702,125 A * 10/1987 Kalns ............................. 475/205
7,575,079 B2 * 8/2009 Minamikawa ........... 180/65.285

2007/0021257 A1 1/2007 Klemen et al.
2012/0295750 A1 11/2012 Fickel et al.

FOREIGN PATENT DOCUMENTS

| DE | 10 2010 031 744 A1 | 1/2012 |
| DE | 10 2010 050 709 A1 | 5/2012 |
| WO | WO 2011/082707 A1 | 7/2011 |
| WO | WO 2011/145937 A1 | 11/2011 |

OTHER PUBLICATIONS

German-language Written Opinion (PCT/ISA/237) dated Oct. 30, 2013 (five (5) pages).
German Office Action dated Jun. 3, 2013 (six (6) pages).

* cited by examiner

DRIVE DEVICE FOR A MOTOR VEHICLE AXLE WHICH, IN PARTICULAR, IS ELECTRICALLY-DRIVEN

CROSS REFERENCE TO RELATED APPLICATIONS

This application is a continuation of PCT International Application No. PCT/EP2013/067528, filed Aug. 23, 2013, which claims priority under 35 U.S.C. §119 from German Patent Application No. 10 2012 017 352.0, filed Aug. 31, 2012, the entire disclosures of which are herein expressly incorporated by reference.

BACKGROUND AND SUMMARY OF THE INVENTION

The present invention relates to a drive device for a a motor vehicle axle and, in particular, to a drive device for an electrically driven axle of a motor vehicle.

It is generally known, in the case of electrically driven motor vehicles or in the case of hybrid drives, for one or both axles of the motor vehicle to be driven by way of an electric machine. The electric machine outputs a drive torque via a transmission gearing to a downstream differential. To cover the speed range of the motor vehicle with manageable rotational speeds at the electric machine, it may be advantageous for this purpose for the transmission gearing to be switchable into two transmission ratio stages.

A problem addressed by the invention is that of proposing a drive device of the generic type which, while being of structurally compact construction, permits expedient torque distributions and toothing engagement ratios which are particularly well adapted to electric machines.

The solution to said problem, according to the invention, provides that the transmission gearing is formed by two planetary gear sets which are coupled to one another and which can be switched into two transmission ratio stages by way of switching elements. The transmission gearing, which is in the form of a 4-shaft coupling gearing, may be of a nested design in an advantageous manner in terms of gearing technology, and furthermore, owing to the numerous possible tooth engagements, permits the transmission of high levels of power while being of structurally compact construction.

Here, it is particularly preferably possible for the switching elements to be formed by two brakes, which each immobilize at least one gear element of the planetary gear sets. The brakes, which are positioned in the gear set housing, are operable (electrically or hydraulically) more easily from a construction aspect than clutches, and furthermore effect partial support of the drive torques directly into the gear set housing while simultaneously reducing the load on the respective gear elements and/or switching elements.

In one advantageous refinement of the invention, the planetary gear sets may, in their stationary transmission ratio, be in the form of minus gear sets. Minus gear sets have, inter alia, the advantage that they can be of structurally simple design and require little structural space in terms of their radial extent.

In a preferred embodiment of the invention, the driven element of the planetary gear set may be the sun gear of the first planetary gear set, and the drive output element may be the web of the first planetary gear set, wherein furthermore, the web of the first planetary gear set is coupled to the internal gear of the second planetary gear set, and the internal gear of the first planetary gear set is connected to the web of the second planetary gear set, and wherein one switching element is connected in terms of drive to the web, and the other switching element is connected in terms of drive to the sun gear of the second planetary gear set. With this coupling of the two planetary gear sets, it is the case in the first transmission ratio stage that the drive torque from the electric machine runs only via the first planetary gear set, while the second planetary gear set is free from load. By contrast, in the second transmission ratio stage, all gear elements or shafts of the planetary gear sets transmit power, and are accordingly subjected to load. By changing the transmission ratio of the second planetary gear set, it is possible for the step change between the transmission ratio stages and the transmission ratio in the second transmission ratio stage to be adapted, without significant modification of the gear set construction, to different levels of drive power of the electric machine and/or to different vehicle types, for example.

Here, it is possible in a particularly advantageous manner in terms of design and construction for a web cheek of the web of the first planetary gear set to form a structural unit with the internal gear of the second planetary gear set. This structural unit may be of relatively solid form, whereby the distortion that often occurs in the manufacture of internal gears can be eliminated and high levels of concentricity and toothing quality can be realized. This ensures improved running smoothness at the high rotational speeds that are encountered in the case of electric drives and at the resulting high toothing engagement frequencies.

Furthermore, the web cheeks, which face toward one another, of the first and of the second planetary gear set may be arranged radially one above the other (in nested form) and substantially in the same plane of rotation. This results in a significant axial shortening of the drive device, which furthermore promotes flexurally rigid mounting of the gear elements in the gear set housing.

Furthermore, it is particularly advantageous if the two switching elements or brakes are arranged radially one above the other and may therefore be standard components such as are known for example from dual-clutch transmissions (in this case in the form of clutches).

In a further advantageous refinement of the invention, the internal gear of the second planetary gear set may have an external toothing which, in conjunction with a pawl mounted pivotably in the housing, acts as a parking lock. As a result of the specified coupling of the two planetary gear sets, said internal gear forms a fixed connection, in terms of gearing, to the output shaft to the differential, such that, as is conventional in the case of parking locks, the drive wheels of the motor vehicle are blocked via the gear elements, regardless of the state of the switching elements, when the internal gear is blocked.

In a highly advantageous refinement of the invention, a transmission drive mechanism with step-down transmission ratio may be connected into the force flux between the planetary gear sets and the differential, which transmission drive mechanism raises the rotational speed level in the planetary gear sets, whereby the gear elements and switching elements thereof can be designed to be of a more lightweight construction despite high drive output torques at the wheels of the motor vehicle.

The transmission drive mechanism may particularly preferably be formed by a sun gear connected to the drive output web of the first planetary gear set, by a web which bears planet gears and which outputs drive to the differential, and by an internal gear fixed with respect to the housing. Owing to the support of the internal gear in the housing, the loads on the switching elements and brakes are reduced to an even greater extent.

In an embodiment of the mounting of the planetary gear sets in the housing of the drive device, which is particularly advantageous in terms of construction, the web of the first planetary gear set and the internal gear of the second planetary gear set may be mounted, by way of a common annular flange and a rolling bearing, on a drive shaft which is connected to the electric machine and which bears the sun gear and which has a radially outwardly extending bearing ring, or directly in the gear set housing. Furthermore, the web of the second planetary gear set may be supported, together with the internal gear of the first planetary gear set, in the annular flange by way of a further rolling bearing. Finally, the web of the second planetary gear set may additionally be rotatably mounted, by way of a third rolling bearing, on a hollow shaft which connects the sun gear of the second planetary gear set to one switching element or to one brake. These features result in the gear elements being mounted in a flexurally rigid fashion, and so as to be capable of withstanding high rotational speeds, with a low outlay in terms of bearing technology.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
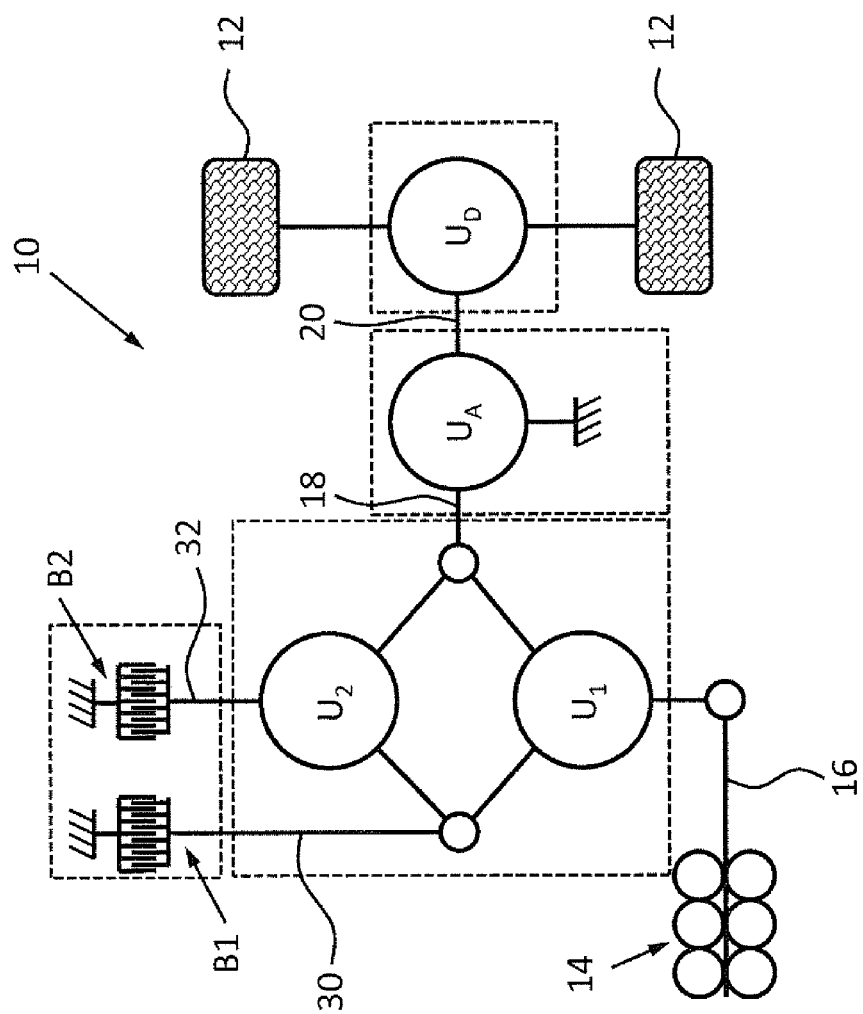
FIG. 1 is a schematic diagram, using Wolf symbolic representations, of an electrically driven drive device for an axle of a motor vehicle, having two planetary gear sets, a transmission drive mechanism and a differential, the drive output shafts of which output drive torque to the driven wheels of the motor vehicle.

FIG. 1 shows, using Wolf symbolic representations, the drive device 10 for the electric drive of an axle (front axle or rear axle) of a motor vehicle in its basic construction. The drive device 10 is composed of two planetary gear sets (epicyclic gear sets) $U_1$, $U_2$, a downstream transmission drive mechanism $U_A$ and a differential $U_D$, which differential outputs drive power to the wheels 12 of the motor vehicle.

The planetary gear sets $U_1$ and $U_2$ are, as will also be discussed below, connected together to form a 4-shaft coupling gearing, by virtue of two shafts of $U_1$ and $U_2$ being connected to one another and in each case one shaft 30, 32 of the four shafts being coupled to the housing (immobilized), for the purpose of forming two transmission ratio stages, by way of two switching elements or brakes $B_1$ and $B_2$.

The drive power is input from the electric machine 14 (merely indicated) via a drive shaft 16 to the first planetary gear set $U_1$, the drive power is output to the transmission drive mechanism $U_A$ by means of an output shaft 18, and the drive power is output to the differential $U_D$ via a further output shaft 20.

Figure 2:
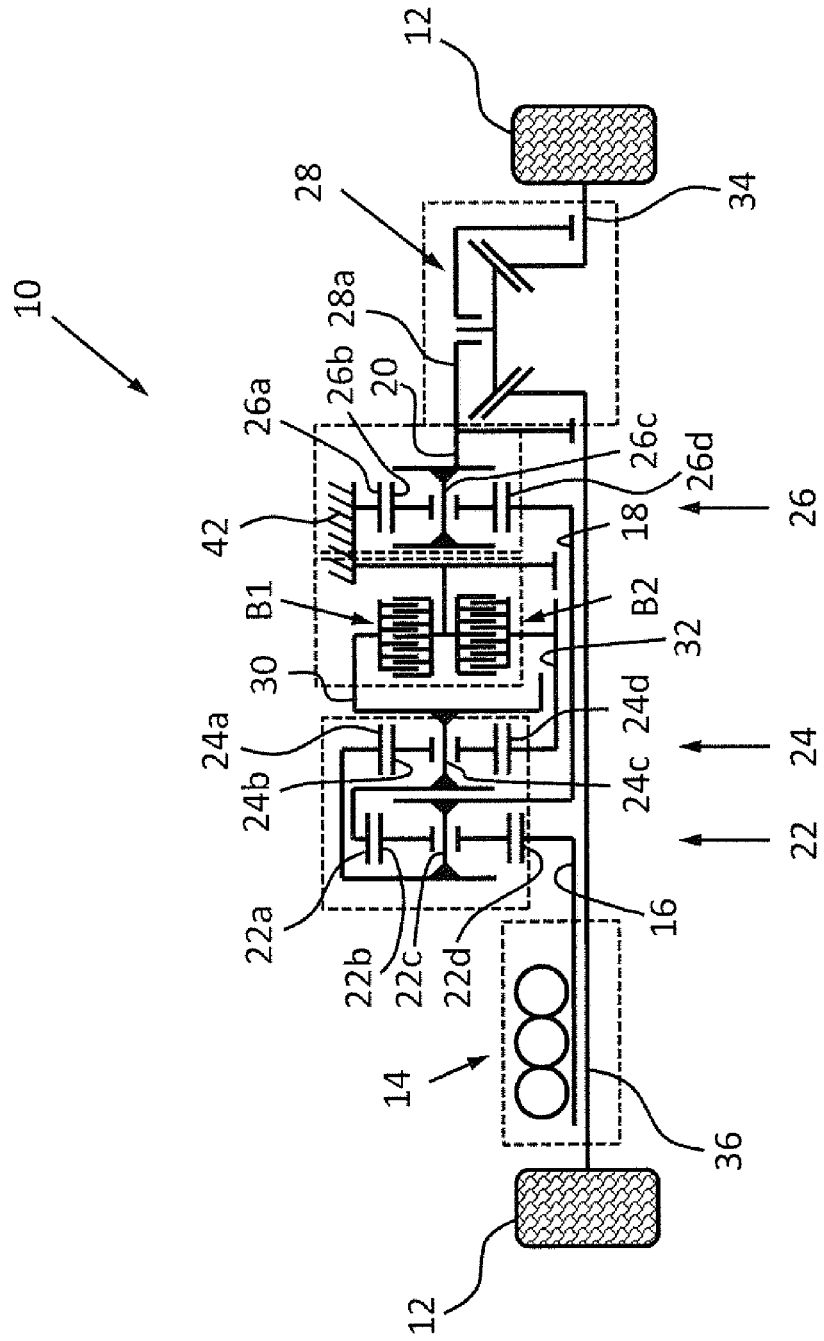
FIG. 2 is a block circuit diagram of a first exemplary embodiment of the drive device per FIG. 1, with a coaxial arrangement of the planetary gear sets, of the transmission drive mechanism, of the switch elements in the form of brakes, and of a bevel gear differential.

FIG. 2 shows, in the form of a block circuit diagram, a first exemplary embodiment of the drive device 10 as per FIG. 1 with the first planetary gear set $U_1$ or 22, the second planetary gear set $U_2$ or 24, the transmission drive mechanism $U_A$ or 26 and the differential $U_D$ or 28, which in this case is in the form of a bevel gear differential; use may however also be made, as appropriate, of a spur gear differential $U_D$ of a known type of construction.

The coupling of the two planetary gear sets 22, 24 is as follows. The drive shaft 16 of the electric machine 14 bears the sun gear 22d of the planetary gear set 22, whose web 22c, which bears the planet gears 22b, is connected in terms of drive to the internal gear 24a of the planetary gear set 24.

The internal gear 22a, which is likewise in engagement with the planet gears 22b, of the first planetary gear set 22 is connected to the web 24c, which bears planet gears 24b, of the second planetary gear set 24.

Coaxially adjacent to the planetary gear sets 22, 24, the two brakes $B_1$ and $B_2$, constructed as multiplate clutches, are arranged radially one above the other, by which brakes alternately either the web 24c of the second planetary gear set 24 can be braked, so as to be immobilized, via the (hollow) shaft 30 or the sun gear 24d can be braked, so as to be immobilized, via the hollow shaft 32.

The brakes $B_1$, $B_2$ may be actuated electrically by way of corresponding actuators or hydraulically by way of actuating pistons which, when correspondingly activated, alternately brake the shafts 30, 32 so as to immobilize them with respect to the housing, and thus switch the two transmission ratio stages.

The planetary gear sets 22, 24 or the web 22c drive, via the output shaft 18, the sun gear 26d of the transmission drive mechanism 26, whose web 26c, which bears the planet gears 26b, drives the differential case 28a of the differential 28 via the output shaft 20. The internal gear 26a is supported so as to be fixed with respect to the housing 42.

In a known manner, the differential case 28a of the differential outputs drive power, in power-distributed fashion, via the differential bevel gears and the axle bevel gears to the drive output shafts 34, 36 which drive the wheels 12. One drive output shaft 36 extends through the drive shaft 16 and the output shaft 18, which are in the form of hollow shafts, and through the coaxial hollow shaft 32 mounted on the output shaft 18. In the exemplary embodiment, the electric machine 14 is furthermore illustrated as being of a hollow-shaft type of construction (with annular rotor and stator), though this is not imperatively necessary.

When the web 24c is braked, so as to be immobilized, by means of the brake $B_1$, the first transmission ratio stage prevails, in which the force flux runs from the sun gear 22d via the planet gears 22b to the web 22c, and from the latter via the output shaft 18 to the transmission drive mechanism 26 and, via the web 26c thereof and the output shaft 20, to the differential 28.

By contrast, when the sun gear 24d of the planetary gear set 24 is braked so as to be immobilized, all of the gear elements of the two planetary gear sets 22, 24 are under load, and drive is output, again to the transmission drive mechanism 26 and the differential 28 via the output shaft 18, in the second transmission ratio stage with a higher step-up transmission ratio.

The planetary gear sets $U_1$ or 22 and $U_2$ or 24 are configured as minus gear sets with a stationary transmission ratio preferably between −2 and −3.5, whereby, aside from structural advantages, it is possible to realize expedient final transmission ratios between the driving electric machine 14 and the differential 28, at which drive is output, of the axle of the motor vehicle.

Figure 3:
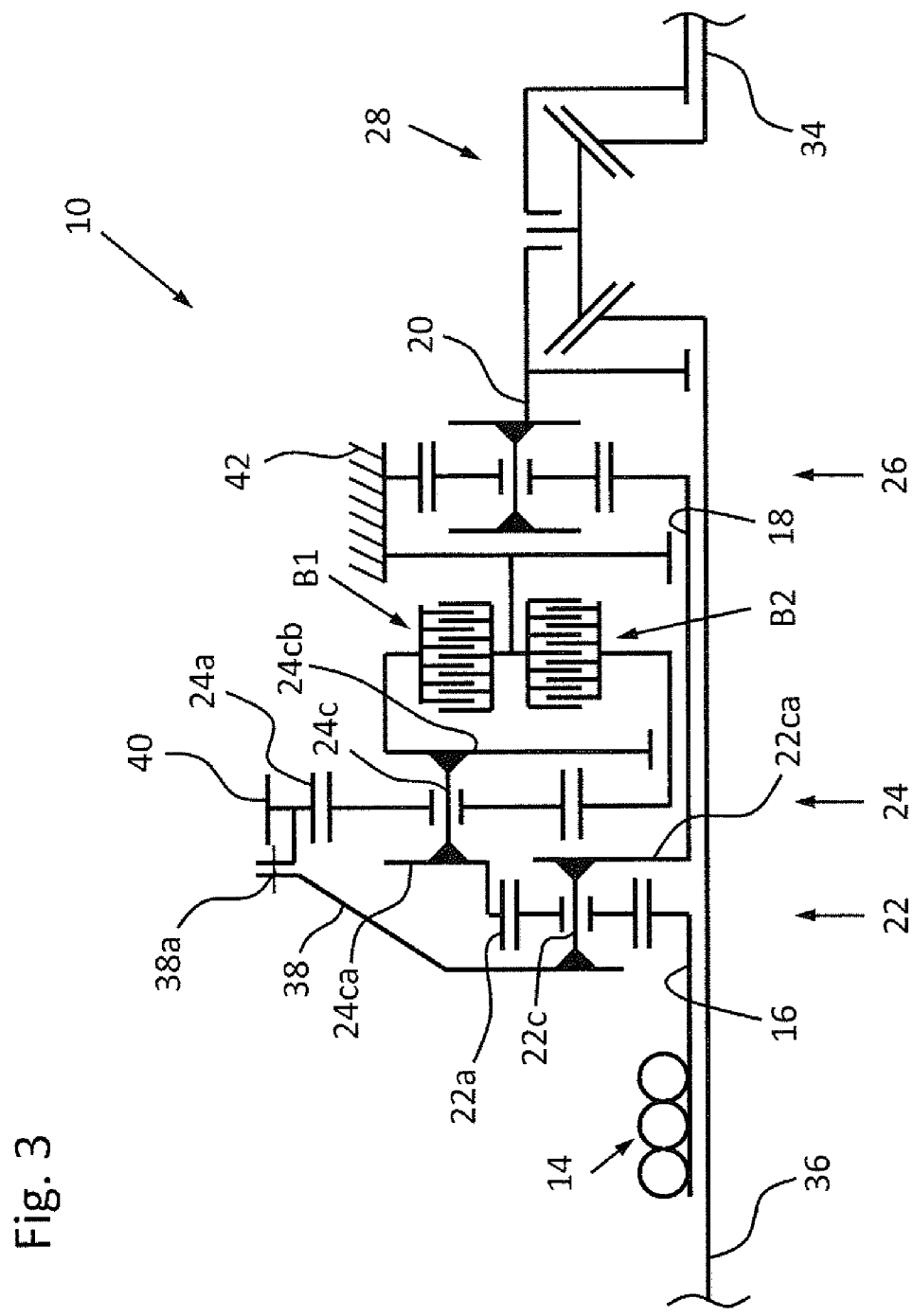
FIG. 3 is a block circuit diagram of an alternative embodiment of the drive device in relation to FIG. 2, with an axially shorter arrangement of the gear elements of the two planetary gear sets and with a parking lock.

FIG. 3 shows an alternative drive device 10 in relation to FIG. 2, which drive device will be described only to the extent that it differs significantly from the embodiment as per FIG. 2. Functionally identical parts are denoted by the same reference signs.

In contrast to FIG. 2, from a structural aspect, the web 22c of the first planetary gear set 22 is, by way of an annular flange 38 and a radially outer flange connection 38a, formed as a structurally unipartite component together with the internal gear 24a of the second planetary gear set 24, which component may accordingly be of a relatively solid design and permits good concentricity qualities.

Furthermore, the left-hand web cheek 24ca of the web 24c of the second planetary gear set 24 is formed in one piece with the internal gear 22a of the first planetary gear set 22, wherein the web cheek 24ca is situated radially outside, and in the same plane of rotation with, the web cheek 22ca of the web 22c.

The internal gear 24a of the planetary gear set 24 is furthermore provided with an external toothing 40 which, in a manner which is not illustrated, forms, in interaction with a pawl (not illustrated) arranged pivotably in the gear set housing, a parking lock. When activated, the parking lock blocks the drive output-side gear elements, including the output shaft 20, so as to immobilize them with respect to the housing.

Figure 4:
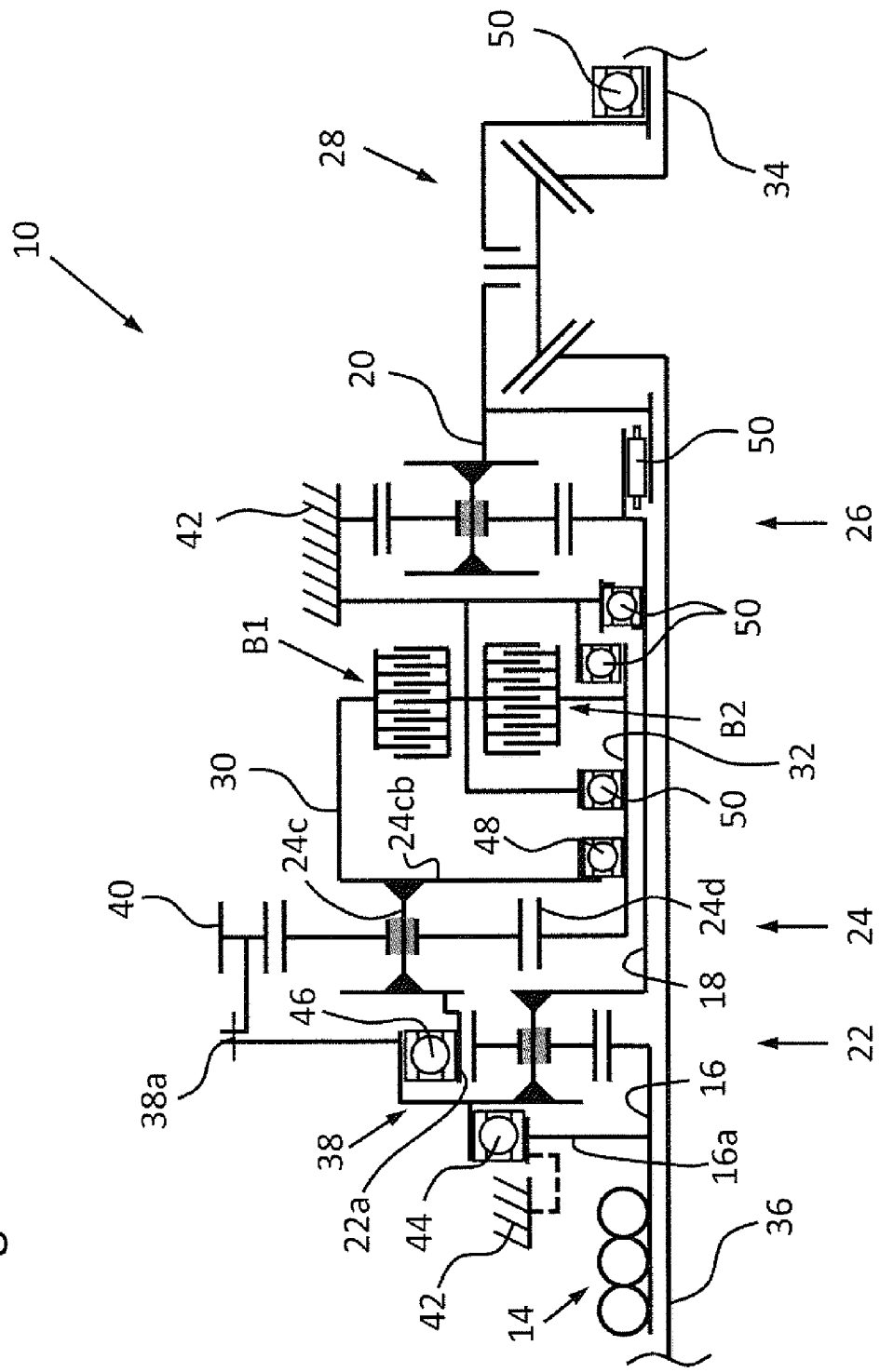
FIG. 4 is a block circuit diagram of the drive device per FIG. 3 with a diagrammatic illustration of the mounting thereof in the gear set housing of the drive device.

FIG. 4 schematically illustrates the rolling bearings that rotatably receive the gear elements and shafts of the drive device 10 in the axle gear set housing 42 (merely indicated). Depending on design circumstances, the rolling bearings may be needle-roller bearings, ball bearings, roller bearings, etc.

Here, the annular flange 38 is mounted, by way of a first ball bearing 44, with respect to a radially outwardly extending bearing ring 16a on the drive shaft 16, or else alternatively on a housing cover (indicated by dashed lines) of the gear set housing 42 (not illustrated in any more detail).

A second ball bearing 46 is arranged between the annular flange 38 and the outer circumference of the internal gear 22a, which, as explained in FIG. 3, is formed in one piece with the web 24c of the second planetary gear set 24.

By means of a third ball bearing 48, the web 24c or the right-hand web cheek 24cb thereof is furthermore mounted on the hollow shaft 32 axially between the sun gear 24d of the second planetary gear set 24 and the brake $B_2$.

Further rolling bearings denoted generally by 50 are provided between the gear set housing 42 and gear elements and between shafts, arranged telescopically one inside the other, of the drive device (see the drawing in FIG. 4).

If appropriate, the drive device 10 could also be formed without a transmission drive mechanism $U_A$ or 26. The differential 28 could also be configured as a spur gear differential (epicyclic gear set $U_D$). Furthermore, the electric machine 14 could, for example, also be connected to the drive shaft 16 via a spur gear drive mechanism.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive device for an electrically driven axle of a motor vehicle, comprising:
    a driving electric machine;
    a transmission gearing coupled to the driving electric machine; and
    a differential coupled to the transmission gearing, wherein
    the driving electric machine, the transmission gearing and the differential operate to output power to driven wheels of the motor vehicle via output shafts, and
    the transmission gearing comprises two planetary gear sets coupled to one another and switchable into two transmission ratio stages via switching elements, wherein a driven element of the two planetary gear sets is a sun gear of the first planetary gear set and a drive output element is a web of the first planetary gear set,
    the web of the first planetary gear set is coupled to an internal gear of the second planetary gear set,
    an internal gear of the first planetary gear set is connected to a web of the second planetary gear set, and wherein
    one of said switching elements is connected in terms of drive to the web of the second planetary gear set and another of said switching elements is connected in terms of drive to a sun gear of the second planetary gear set.

2. The drive device according to claim 1, wherein the switching elements comprise two brakes, each brake being configured to immobilize at least one gear element of the two planetary gear sets.

3. The drive device according to claim 2, wherein the two planetary gear sets are in a form of minus gear sets in their stationary transmission ratio.

4. The drive device according to claim 1, wherein the two planetary gear sets are in a form of minus gear sets in their stationary transmission ratio.

5. The drive device according to claim 1, wherein a web cheek of the web of the first planetary gear set forms a structural unit with the internal gear of the second planetary gear set.

6. The drive device according to claim 5, wherein the structural unit of the web cheek and the internal gear is held together by way of a radially external flange connection.

7. The drive device according to claim 1, wherein web cheeks, which face toward one another, of the webs of the first and of the second planetary gear sets are arranged radially one above the other and in substantially a same plane of rotation.

8. The drive device according to claim 5, wherein web cheeks, which face toward one another, of the webs of the first and of the second planetary gear sets are arranged radially one above the other and in substantially a same plane of rotation.

9. The drive device according to claim 6, wherein web cheeks, which face toward one another, of the webs of the first and of the second planetary gear sets are arranged radially one above the other and in substantially a same plane of rotation.

10. The drive device according to claim 1, wherein a web cheek of the web of the second planetary gear set forms a structural unit with the internal gear of the first planetary gear set.

11. The drive device according to claim 2, wherein the two brakes are arranged so as to be situated radially one above the other.

12. The drive device according to claim 1, wherein the internal gear of the second planetary gear set has an external toothing which, in conjunction with a pawl mounted pivotably in the gear set housing, acts as a parking lock.

13. The drive device according to claim 1, wherein a transmission drive mechanism is connected into a force flux between the two planetary gear sets and the differential.

14. The drive device according to claim 1, wherein a transmission drive mechanism is connected into a force flux between the two planetary gear sets and the differential.

15. The drive device according to claim 14, wherein the transmission drive mechanism comprises a sun gear connected to the drive output web of the first planetary gear set, by a web which bears planet gears and which outputs drive power to the differential, and by an internal gear fixed with respect to the housing.

16. The drive device according to claim 1, wherein the web of the first planetary gear set and the internal gear of the second planetary gear set are mounted, by way of a common annular flange and a rolling bearing, on a drive shaft which bears the driven sun gear and which has a radially outwardly extending bearing ring, or directly in the gear set housing.

17. The drive device according to claim 16, wherein the web of the second planetary gear set is supported, together with the internal gear of the first planetary gear set, in the annular flange by way of a second rolling bearing.

18. The drive device according to claim 17, wherein the web of the second planetary gear set is additionally rotatably mounted, by way of a third rolling bearing, on a hollow shaft which connects the sun gear of the second planetary gear set to one switching element.

19. The drive device according to claim 17, wherein the web of the second planetary gear set is additionally rotatably mounted, by way of a third rolling bearing, on a hollow shaft which connects the sun gear of the second planetary gear set to a brake.

* * * * *